United States Patent [19]

Noland

[11] Patent Number: 5,509,382
[45] Date of Patent: Apr. 23, 1996

[54] TANDEM-DIFFERENTIAL-PISTON CURSIVE-CONSTANT-VOLUME INTERNAL-COMBUSTION ENGINE

[76] Inventor: Ronald D. Noland, 2334 State Hwy. NN, Advance, Mo. 63730

[21] Appl. No.: 442,664

[22] Filed: May 17, 1995

[51] Int. Cl.$^6$ .................................................. F02B 33/10
[52] U.S. Cl. ........................................ 123/66; 123/71 R
[58] Field of Search ............................ 123/66, 68, 71 R, 123/52.5

[56] References Cited

U.S. PATENT DOCUMENTS

| | | | |
|---|---|---|---|
| 1,413,541 | 4/1922 | Reed | 123/66 |
| 2,063,817 | 12/1936 | Mallory | 123/52.5 |
| 2,545,999 | 3/1951 | Hirschberg | 123/66 |
| 3,203,263 | 8/1965 | Gaffney | 123/66 |
| 3,722,482 | 3/1973 | Moore | 123/66 |
| 5,050,570 | 9/1991 | Thring | 123/71 R |

FOREIGN PATENT DOCUMENTS

| | | | |
|---|---|---|---|
| 87/05073 | 8/1987 | WIPO | 123/71 R |

*Primary Examiner*—David A. Okonsky

[57] ABSTRACT

An internal-combustion engine having a main cylinder, a crosshead motor piston mounted on a piston rod, and a charger piston, which reciprocates below the motor piston and has a hole for the piston rod to slide through, is shown in full section in FIG. 1. The piston rod is connected through a motor connecting rod to a short-throw motor crankpin that separates a pair of long-throw charger crankpins that follow it by eight degrees and are connected through a pair of charger connecting rods to the charger piston. The pistons separate as they descend thereby opening a charger cavity wherein a fuel-air charge is drawn via intake ports through the main-cylinder wall. As the pistons rise, the intake ports are blocked; the charge is compressed and forced upward past the motor piston into a hot combustion chamber through transfer channels along the main-cylinder wall that remain blocked by the motor piston until it approaches its zenith. The charge is ignited and burns cursively while entering the hot combustion chamber. Charging is completed when the top of the charger piston contacts the bottom of the motor piston while the transfer channels are being closed by the motor piston as it descends. A piston valve, operated by a link rod attached to the motor connecting rod, opens and closes exhaust ports and primary intake ports. Insulated refractory materials are used for the head plate, motor-piston crown, and valve crown to conserve heat for ultra thermal efficiency.

20 Claims, 4 Drawing Sheets

TANDEM-DIFFERENTIAL-PISTON CURSIVE-CONSTANT-VOLUME INTERNAL-COMBUSTION ENGINE

TECHNICAL FIELD

My invention relates to internal-combustion engines of the type employing a motor piston that reciprocates in a cylinder while turning a crankshaft for the extraction of motive power from the expansion of hot gases produced by the combustion of a compressed fuel-air charge that is supplied under pressure to a combustion chamber by a charger piston. A type fitting into the broad classification of two-stroke pump-compression cycle internal-combustion engines.

BACKGROUND ART

Reciprocating piston internal-combustion engines that are in wide use today are predominately of the four-stroke cycle type, although the two-stroke cycle type with crankcase charging is also quite common.

Four-stroke cycle internal-combustion engines were patented by Alphonse Beau de Rochas in France in 1862. He specified using a single cylinder and set forth the following mode of operation:

I. Drawing in the charge during one whole piston stroke.

II. Compression during the following stroke.

III. Inflamation at the dead point, and expansion during the third stroke.

IV. Discharge of the burnt gases from the cylinder during the fourth and last stroke.

Engines employing the four-stroke operating cycle were first manufactured by Nicolaus Otto in Deutz, Germany in 1876 on which he was granted a patent in 1877. They operate on a mixture of air and a fuel gas or a volatile liquid fuel such as gasoline, kerosene, or alcohol and have been very successful.

The paradox is that although the engines derive their power by the expansion of heated gases from the combustion of a fuel-air mixture within a combustion chamber they are intolerant of the residual heat that is absorbed by the surfaces of the combustion chamber. Instead of using the residual heat to increase the pressure of the next fuel-air charge, the chamber must be cooled sufficiently to prevent preignition; that is, ignition of the charge from a hot surface before the piston is at the proper place approaching the top of its travel. Further, the chamber must be cooled to aid in the prevention of detonation that is caused by autoignition of the end gas, which is the yet unburned part of a burning charge.

Finally, even if preignition and detonation had not made cooling necessary, the engine is not arranged to extract power from the residual heat because the increased work of compression in a hot cylinder cancels the increased work output.

The charge must be compressed (or confined) before heat is added to it if there is to be any net work realized from the heating.

Volumetric efficiency of induction suffers a loss of about 5% in a liquid cooled engine from heating of the charge during the intake stroke with greater losses from hotter operation in air cooled engines.

Two-stroke cycle engines of the Day model, in which a charge of fuel, lubricating oil, and air is inducted into the crankcase and transferred into the motor cylinder while the piston is down for subsequent compression, are also susceptible to all of the foregoing problems.

Most diesel engines have a four-stroke cycle with late cylinder injection in which a charge of air is compressed into one-fourteenth or less of its atmospheric volume so as to heat it sufficiently to initiate combustion when fuel is injected into it at the proper time. They are, accordingly, not susceptible to preignition and detonation in the manner of carbureted engines; however, they are susceptible to similar losses in volumetric efficiency and increased work of compression in a hot cylinder. These losses undermine attempts to increase the efficiency of diesel engines by "low heat rejection" (hotter) operation, which has also been called adiabatic operation; however, adiabatic refers to an operation without loss or gain of heat from the enclosure; this is not the case when air is inducted into and compressed in a hot cylinder where heat transfer is intense and the work of compression is substantially increased.

In addition to being unable to use all of the heat generated by the combustion, the bulk of a power plant is substantially increased by a cooling system, and engines have been forced to expend part of the power generated to remove a substantial portion of the absorbed heat and to transport unwieldy cooling systems.

Detonation has came to be of paramount importance in both four-cycle and two-cycle carbureted engines; that is, engines in which fuel is added to the air by any means before the inlet port to the compressing cylinder is closed. In addition to the requirement that the combustion chamber be kept as cool as practical, which leads to the adoption of liquid cooling systems, it limits the compression ratio to a level that will not detonate with the available fuel and thereby necessitates the production of expensive fuels with high octane ratings, which are a measure of their resistance to detonation. It also leads to the use of antidetonation (antiknock) agents such as tetraethyl lead and requires the use of extremely rich fuel-air mixtures when maximum resistance to detonation is necessary such as an aircraft at take off power as well as compromising the shape of the combustion chamber and promoting the use of water or alcohol injection.

There have been engines made that compress the charge with a separate pump cylinder and then burn and expand it against a motor piston in a motor cylinder. Their general mode of operation can be called a two-stroke pump-compression cycle, but none have had lasting success. Several kinds have been tried.

One was patented in 1872 by George Brayton of Boston, Mass. Another, the Simon, was an English adaptation of it. The Brayton used a pump to compress a mixture of fuel and air into a receiver tank from which it was valved through a wire gauze flame barrier into a motor cylinder in which it was ignited upon entry for cursive combustion; that is, the charge burned as it flowed into the combustion chamber. The volume of the charge increased from the heating, but the pressure could not increase from that in the receiver (constant-pressure combustion). It was commercially successful for a period, but later it could not compete with the Otto engine, which was much more efficient because it operated at higher pressures achieved with constant-volume combustion.

Another engine having a pump cylinder and a motor cylinder was the Wittig & Hees which was made in Germany around 1880. Its pistons were connected to crankpins set at the same angle. When the pistons were 40% of the stroke from full compression, the exhaust valve closed and the fresh charge was pushed into the motor cylinder to be compressed with the hot residual gas. Ignition was at the dead point (top dead center). If the engine was working hard with the fuel-air mixture lean, preignition from the compressed residual gas seems likely, but perhaps it operated satisfactorily with the very low compression ratios used in, that period with a normally rich fuel-air mixture. Because its ignition was delayed until the entire charge was in the motor cylinder and fully compressed, it would have been subject to detonation had the compression ratio been higher, so it offered no advantage over the Otto type. This engine had a two-piston cycle having constant-volume combustion; however, charging started far too early for cursive combustion to be used.

Foulis of Glascow, Scotland brought out an improved version of his engine having a motor cylinder and pump in 1881. Its charge was compressed in the pump and valved through a wire gauze flame barrier and a regenerator into a red hot combustion chamber with cursive combustion. Admission continued until one third of the motor stroke was completed for constant-pressure combustion. The volume of the regenerator and passages further prevented the high pressure constant-volume combustion necessary for efficiency.

As discussed in the last few paragraphs, engines of diverse characteristics have been included in the two-stroke pump-compression cycle classification. The distinguishing characteristic linking them will herein be called "upper-cylinder pressure charging"; defined as the forcible transfer under pressure by a pump of fresh working fluid into the main cylinder after the exhaust port is closed and while the motor piston is in the upper half of its travel, which thereby raises the pressure materially above atmospheric pressure.

The expression "pump-compression cycle engine" will hereinafter mean only that the engine being described has a pump piston operating in a cylinder and a motor piston operating in a cylinder with upper-cylinder pressure charging.

A persistant school of thought seems to have arose during the nineteenth century wherein it was desired to use the heat of combustion only to increase volume rather than to increase pressure, probably because stronger engines would be necessary for the higher pressures. Isothermal combustion was favored by Rudolph Diesel in 1897 when developing his compression-ignition engine wherein the maximum temperature attained during compression of the air was not intended to be exceeded by the temperature during combustion. This approach allows the pressure to decrease as volume increases even while the fuel is being burned and gives even lower efficiency than with constant-pressure combustion.

The major contribution to efficiency of constant-volume combustion, wherein the temperature and pressure attained during compression are greatly increased by the combustion of fuel with an accompanying increase in work output and efficiency that is obtained from the higher pressure upon the piston as it moves downward, was not yet obvious, although Beau De Rochas had specified it; and Otto had already put it into practice.

The higher efficiency that can be derived from constant-volume combustion may be easily seen from the fact that the temperature increase in a compressed charge of air will be 1.4 times as great by adding a fixed quantity of heat at constant volume rather than at constant pressure from the ratio of the heat capacity at constant pressure to that at constant volume, which is 1.4 for air; and then using the expression derived from the work of Sadi Carnot in 1824 for the maximum possible efficiency of any engine working between two temperatures:

$$e=1-T_2/T_1$$

which relates the maximum temperature during the cycle of the compressed charge after the addition of heat, $T_1$, to the minimum temperature after expansion when the exhaust valve is about to open, $T_2$, assuming that the expansion will be carried out to the same temperature in both cases, which will require greater expansion for the constant pressure engine while still giving poorer efficiency.

The demise of double piston engines having compression in one cylinder and combustion in another was perhaps partly because they were not restricted to constant-volume combustion as was the Otto type, and apparently, designers of the period would opt for constant-pressure combustion when allowed a choice. More difficult to solve are the inherent problems of valving high-pressure gases, effecting total transfer of a fuel-air charge to the motor cylinder and preventing combustion in the charger cylinder. There have been many patents issued over the years for engines working on the two-stroke pump-compression cycle, but none have solved the inherent requirements as well as Otto solved the inherent requirements of the Beau de Rochas cycle.

After Otto's patent expired, the other manufacturers adopted engine designs having all high pressure operations in one cylinder, either the four-stroke cycle type such as his or the two-stroke cycle type such as the Day model with crankcase charging, both of which compress the charge in the hot motor cylinder, which leaves them susceptible to preignition and detonation, the bane of high compression carbureted engines, and necessitates the extraction and waste of the heat absorbed by the internal surfaces of the engine.

Meanwhile, the gas turbine engine has been designed so that it achieves excellent efficiency, even with constant-pressure combustion, by using incoming air to cool itself while increasing the volume of the air without wasting heat into a cooling system. Its reciprocating-piston-engine analogue, the internal-combustion pump-compression cycle engine, should be capable of even greater efficiency, particularly when it is permitted the additional advantage of high-pressure-constant-volume combustion of a premixed fuel-air charge.

There is no theoretical requirement for the waste of heat by an internal-combustion piston engine other than that in the exhaust gas, and that may be minimized by using a large compression ratio combined with a larger expansion ratio, which may be done at will when designing an internal-combustion pump-compression cycle engine.

DISCLOSURE OF INVENTION

The fundamental requirements of an internal-combustion piston engine include:

(a) compression of a charge of fuel and air with the least work such as in an unheated cylinder so that no residual heat of combustion will be added to it before it is compressed to the extent desirable at the start of constant-volume combustion, and then (b) use of residual heat plus combustion of the fuel-air charge to increase its temperature i(and hence pressure) as efficiently as possible, which requires constant-volume combustion in a hot insulated chamber, and then (c) expansion of the hot high-pressure gases against a motor piston before they lose their heat (and hence pressure) to the surfaces of their enclosure, which also requires that the enclosure be hot and insulated.

The conflicting requirements of needing to compress the charge in an unheated cylinder for the least work input, but to burn and expand it in a hot cylinder for the most work output suggest that the engine have two cylinders: an unheated charger cylinder in which a fuel-air charge is brought to compression and a hot motor cylinder with insulated surfaces into which the compressed charge is transferred prior to heating by conduction from hot surfaces and by combustion; that is, an internal-combustion pump-compression cycle engine.

Four inherent problems of the internal-combustion pump-compression cycle engine that must be solved are: effecting total transfer of the fuel-air charge, preventing combustion in the charging cylinder, preventing detonation as combustion proceeds in the hot motor cylinder, and making a completely reliable valving means that will prevent any possibility of combustion gases leaking back from the hot motor cylinder to the charging cylinder.

What I have invented is an engine that uses the lower portion of a cylinder for an unheated charging section while the upper portion of the same cylinder is used for a hot motor section. The sections are separated by a motor piston while a charger piston operates below it.

The two pistons operate in tandem from separate crankpins having different crank radii and crank angles while on a single crankshaft. They operate differentially so that a space that will be called a charger cavity opens between them as they move down and closes as they move up. A thin stratum of space that remains above the motor piston while the charge is being transferred serves as the combustion chamber.

It is called a tandem-differential-piston engine, and it operates on the following cycle:

1. A fuel-air charge is drawn into the unheated charger cavity during the intake (down) stroke of the charger piston.

2. The charge is compressed on the charging (up) stroke of the charging piston and then forcibly transferred into the hot combustion chamber as the charger piston closes against the bottom of the motor piston. It is important that the charge be compressed to a low volume before transfer and combustion begin so that the work of transferring it, pressure multiplied by the change in volume, is minimized. Transfer is completed shortly after the motor piston passes its uppermost position so that combustion can be virtually at constant volume.

3. Ignition of the fuel-air charge is initiated by electric spark as it flows past the motor piston toward the combustion chamber for cursive combustion; that is, burning as it flows in, thereby preventing the buildup of an unburned portion which could detonate. The hot high-pressure combustion gases are expanded during the power (down) stroke of the motor piston. A port is opened for exhaust blowdown as the motor piston nears the end of the power stroke.

4. Part of the remaining combustion gases are pushed out during the exhaust (up) stroke of the motor piston while part is retained and compressed again for automatic ignition of the fuel-air charge as it enters the combustion chamber with electric spark available for starting and low power operation.

The engine has a main cylinder fitted with a reciprocating crosshead type motor piston that is mounted on a piston rod that slides through a hole in a charger piston that serves as a stuffing box and crosshead. The motor piston has a very short stroke and the charger piston has a stroke twice as long. The crankpins for the pistons are slightly out of phase on the crankshaft in the design shown with the motor crankpin leading the charger crankpins by 8 degrees, which will be referred to as an 8 degree lead angle.

To avoid confusion, the crank position will always be specified in terms of the motor crankpin angle as: BMTC (before motor top center), MTC (motor top center) or AMTC (after motor top center). Zenith will be used to denote the highest point reached by a piston or valve in its movement, and nadir will be used to denote its lowest point. When specific numbers are used, they refer to the engine design shown in the drawings.

As the crank rotates, the charger piston descends further than the motor piston, opening a charger cavity between them in the lower portion of the cylinder and drawing in a fuel-air charge from a carburetor through an intake manifold via ports through the side of the main cylinder.

As the pistons rise the charge is compressed. When it has been compressed about 9.5 to 1, the bottom ring of the rising motor piston clears the lower end of a set of shallow grooves, called transfer channels, that reach upward along the inner main-cylinder wall to the combustion chamber and the entire charge is forced into it by the charger piston as it closes toward the bottom of the motor piston during a short interval while each piston passes its zenith.

Opening of the transfer channels begins at 16 degrees BMTC and closing ends 32 degrees later at 16 degrees AMTC, shortly after the top surface of the charger piston has moved into contact with the lower surface of the motor piston completing the charge transfer, but before it has moved out of contact. Their maximum opening height is about 2.3% of the motor piston stroke (0.64 mm in the 28 mm stroke engine shown in the drawings) when the motor piston is at its zenith. The transfer channels are cut shallow so that the velocity of the fuel-air mixture moving up through them will be greater than the flame propagation velocity (at least when the engine is running at high power levels, perhaps not when idling) so as to prevent combustion in the fuel-air mixture before it is past the motor piston and into the combustion chamber. The depth of the channels in conjunction with the fuel-air ratio will determine the minimum operating speed of the engine as well as the upper limit; shallow channels giving higher gas velocity and lower fuel-air ratios giving lower flame propagation velocity to permit slower engine operation.

Nevertheless, as charging nears completion the closing velocity between the pistons slows toward zero; consequently, the velocity of the fuel-air charge through the transfer channels may decrease to zero and even reverse as pressure in the combustion chamber increases; so the flame front may finally travel down the channels. Therein lies the necessity of expelling all of the fuel-air charge from the charger cavity by bringing the top surface of the charger piston into full contact with the lower surface of the motor piston simultaneously with closing off the openings to the transfer channels from the charger cavity so as to obviate any possibility of burning gas in the charger cavity, which could ignite the succeeding charge. Even if the flame were to invade the charger cavity, it would be extinguished as the pistons come into contact; and the succeeding cycle could proceed unhindered.

During the period starting at 16 degrees BMTC when the transfer channels are open, the motor piston is floating with greater pressure below it in the charger cavity than above it in the combustion chamber. At this time the charger piston assumes the function of a motor piston in carrying the pressure load while each piston passes its zenith and descends to the point at 16 degrees AMTC when the top surface of the charger piston is still in contact with the bottom surface of the motor piston, and the transfer channels are again closed by the bottom ring of the motor piston as it descends.

Even though cursive combustion should forestall detonation in the combustion chamber, the last part of the charge that remains to be transferred from the charger cavity will be under a pressure somewhat exceeding the extremely high pressure in the combustion chamber, perhaps near 7000 kPa in an engine engineered for high power and efficiency.

The fuel will therefore still need resistance to autoignition under the heat of compression, but the requirement will not be nearly as severe as it is in the fiery plasma within the hot combustion chamber of conventional carbureted engines where the temperature of the burning gases is very high and the electomagnetic radiation across the infrared, visible, and ultraviolet range of the spectrum is intense. Whereas, in the charger cavity of this engine as charging nears completion, the charge is compressed into a very thin layer between the top surface of the charger piston and the bottom surface of the motor piston. This should strongly inhibit autoignition from compression because the surfaces, which are heated only by compression and are not nearly as hot as combustion chamber surfaces, will attenuate peak temperatures while conducting heat away. It is expected that gasoline around 90 octane, and maybe far less, should be suitable for operation at pressures around 7000 kPa in the charger cavity, judging from the high compression ratio necessary for its use in multifuel compression-ignition engines. Research by Gluckstein and Walcutt has shown that end gas temperature for detonation must be around 1020 degrees Kelvin for many fuels; judging from that, fuels of fairly low octane rating should be suitable as the temperature of the fuel-air charge in the charger cavity should not exceed 850 degrees Kelvin from adiabatic compression to a pressure of 7000 kPa.

The maximum operating pressure of the engine is established by balancing the size of the combustion chamber against the ignition advance angle, a similar procedure to that used for most other carbureted engines; except that, when this engine is under load, ignition will take place when transfer begins, an angle fixed by the designer, so the maximum operating pressure may only be adjusted by modifying the volume of the combustion chamber such as by using a cylinder head gasket of a different thickness.

A piston valve is used to open ports to allow the escape of expanded combustion gases. It is operated by a link rod that is pivotally attached adjacent to the crankpin bearing of the motor-piston connecting rod. This method of operation restricts the choice of the crank angle at port closing because it will be fixed in relation to the crank angle when the port opens; however, unlike other engines, an engine of this kind, which has its fresh charge forced into the combustion chamber by a charger piston after the exhaust port is closed, has no need to thoroughly purge itself of residual gas; that is, combustion gas left over from the previous cycle that is trapped by the piston valve in the expansion chamber, which refers to all of the space contained above the motor piston and the piston valve. A reasonable amount of residual gas is beneficial to the operation because temperature and pressure variations in the combustion chamber are buffered by its presence. The residual gas will maintain the pressure at substantial levels when operating at low power levels from throttling of the fuel-air mixture at the carburetor in contrast to the large drop in pressure and; consequently, efficiency in other carbureted engines. The residual gas that is trapped and compressed again into the combustion chamber will also be hot enough to assist the hot surfaces in promoting combustion of very lean fuel-air mixtures so that engine power can be controlled more by changing the fuel-air ratio in the charge (quality control) and less by restricting the quantity of fuel and air in a charge (quantity control) by throttling; this will also aid fuel efficiency.

Another advantage of the piston valve is that it is pushed down by the expanding combustion gases, thus contributing to the work output of the engine instead of adding to the parasitic loss. The sidewall of the piston valve is used to block outflow of gas during the compression stroke through the lateral intake ports that allow gas flow into the charger cavity during the earlier part of the intake stroke.

Though there are four strokes listed, they are all completed during one revolution of the crankshaft while each piston completes two strokes so the usual convention that was adopted during the nineteenth century and applied to double piston engines requires that it be termed a two-stroke cycle engine.

Because the charge is under compression before it is transferred into the combustion chamber, an engine of this sort would be capable of operating from heat conducted into its working fluid from the closure at the upper end of the cylinder, such as if it had a cylinder head made of copper that was heated by an external source like a coal fire. For this purpose it would be necessary to give the engine an extremely large bore to stroke ratio to provide a large heat transfer area adjacent to a very thin, large area stratum under the cylinder head, which might then be called a thermal chamber instead of a combustion chamber.

Three different piston configurations of the tandem-differential-piston mechanism were contemplated for operation of a pump-compression cycle engine.

All configurations have a charger piston working below a closed lower surface of a motor piston within the same cylinder while having a longer stroke than the motor piston so that a charger cavity that expands and contracts once per cycle is created between a lower surface of the motor piston and the upper surface of the charger piston.

The crosshead type, which has been under discussion already, has a piston rod that connects the motor piston to the connecting rod and slides through a central hole in a charger piston having an outside diameter that fits the main cylinder. It is the least complicated, but it requires the charger piston to travel nearly twice as far along the cylinder as its effective stroke will be to open a charger cavity. It also requires a gas-oil seal along the piston rod.

The first problem can be circumvented by the use of a smaller charger piston in conjunction with an obturating skirt on the motor piston that is formed internally into a cylinder in which the charger piston reciprocates. The disadvantages of this solution include having to use additional piston rings around the skirt, intake ports through the skirt for induction of the charge, and the use of transfer slots leading through the skirt at the upper end where it joins the lower surface of the head of the motor piston for transfer of the charge into the transfer channels in the wall of the cylinder; and it will still have the problem of sealing around the piston rod where it slides through the charger piston.

Another possibility is to use the obturating skirt to reach down and attach to a base for the motor piston. The base then has a slot across its center for a single connecting rod to work through for the charger piston. Dual connecting rods are then pivotally attached to the base for the motor piston by a pair of short piston pins in much the same way that the pair of connecting rods attach to the charger piston in the crosshead type, thus eliminating the piston rod. A short trunk type charger piston then reciprocates inside the cylindrical center section of a long trunk type motor piston with only half of the relative sliding motion that it has in the crosshead type. Intake ports through the skirt to induct the charge into the charger cavity within the motor piston and transfer slots at the top of the charger cavity opening to the transfer channels will also be necessary in this version.

The equations of position for the pistons remains the same providing that revised values for the connecting rod lengths are used.

The preceding version may be preferred in large, long stroke oil burning engines where initial cost is less of a consideration than long life. It does have the disadvantage of failure to transfer all of the charge of working fluid because, when under full power, several percent will be left highly compressed in the transfer slots when the transfer channels are closed; however, an oil engine is likely to be a late-cylinder-injection engine; that is, one in which the fuel is sprayed into the combustion chamber after compression, so the failure to transfer 100% of the working fluid, which in this case will only be air, is not a great problem because there will be no possibility of the flame advancing into the charger cavity.

Thus far the transfer channels considered were grooves along the cylinder wall. Another type of transfer channel adapted to late-cylinder-injection engines is the use of small diameter holes bored vertically down into the upper cylinder wall with an opening at the lower end for entry of the working fluid and an exit at the top. These should cool the cylinder wall more effectively than the open channels; however, they are not believed to be adaptable to carbureted engines because delayed combustion in the channels of the last part of the fuel-air charge to be transferred would heat them. With late-cylinder-injection engines, only air will flow from the channels as the pressure drops and perhaps be useful in completing combustion or diluting residual gas.

In addition to the choice of at least three variations of the piston configuration and two of the transfer channels, a choice must also be made between various kinds of ignition and fuel introduction. These include spark, compression, and glow plug ignition; and fuel introduction by carburetion or cylinder injection.

For the preferred embodiment, the crosshead piston type with a charger piston sized to fit the main cylinder was chosen as the best mode of piston configuration, primarily because it can effect complete transfer of the fuel-air charge, which I believe is practically essential in a carbureted pump-compression-cycle engine; also, it appears to be easier to build and adjust so as to be simple and strong; furthermore, it is not felt that the longer travel of the charger piston or sealing around the piston rod will be a problem because of the protection from hot combustion gases in the lower section of the cylinder where wear is expected to be minimal; also, the charger piston will be under low pressure during most of the cycle.

It is embodied as a carbureted engine, meaning that it has its fuel introduced to the air before the intake ports leading into the charger cavity are closed. Spark ignition carbureted engines are already used for an overwhelming majority of power needs because they are economical, light and simple despite their inherent shortcomings. It is the kind of engine which I believe will most greatly benefit in thermal efficiency, power output, cleaner burning and decreased weight and bulk from the cycle facilitated by the tandem-differential-piston mechanism.

An engine that has its fuel thoroughly mixed with air before the charge enters the combustion chamber can operate much faster and utilize a greater percentage of the air in the charge for combustion at high power levels than can late-cylinder-injection engines. Heretofore, the performance of the carbureted engine has been limited by the joint problem of detonation and preignition. This problem is expected to be substantially reduced in my engine while conservation of heat in the combustion chamber by insulation of as much surface as possible to prevent heat loss from the combustion gases is expected to greatly increase thermal efficiency while obviating the need for cooling much of the engine except for the cylinder walls.

Because the cylinder walls must be kept far cooler than the other surfaces exposed to hot combustion gases, their area is lowered by using a bore to stroke ratio that hitherto would have been considered very large. The upper cylinder walls are cooled internally by the fuel-air charge as it is transferred into the combustion chamber; hence, cooling fins around the outside of the cylinder should provide sufficient additional cooling on most engines, perhaps excepting hard working stationary engines that may require a fan.

Spark ignition was chosen because it can be timed suitably for manual starting when being generated by a simple magneto that will only produce a spark when the engine is being rotated fast enough that it will finish turning through the angle of minimum volume (about 9 degrees AMTC in the utility engine shown) after ignition of the charge.

If an electrical system is available the engine can have spark ignition from a storage battery with centrifugal advance from the starting position to a running position, or it can use glow plug ignition; perhaps with a compression ratio high enough for reliable ignition by compressed residual gas after starting with a glow plug but not high enough for autoignition in a cool engine or the charger cavity.

BEST MODE FOR CARRYING OUT THE INVENTION

Figure 1:
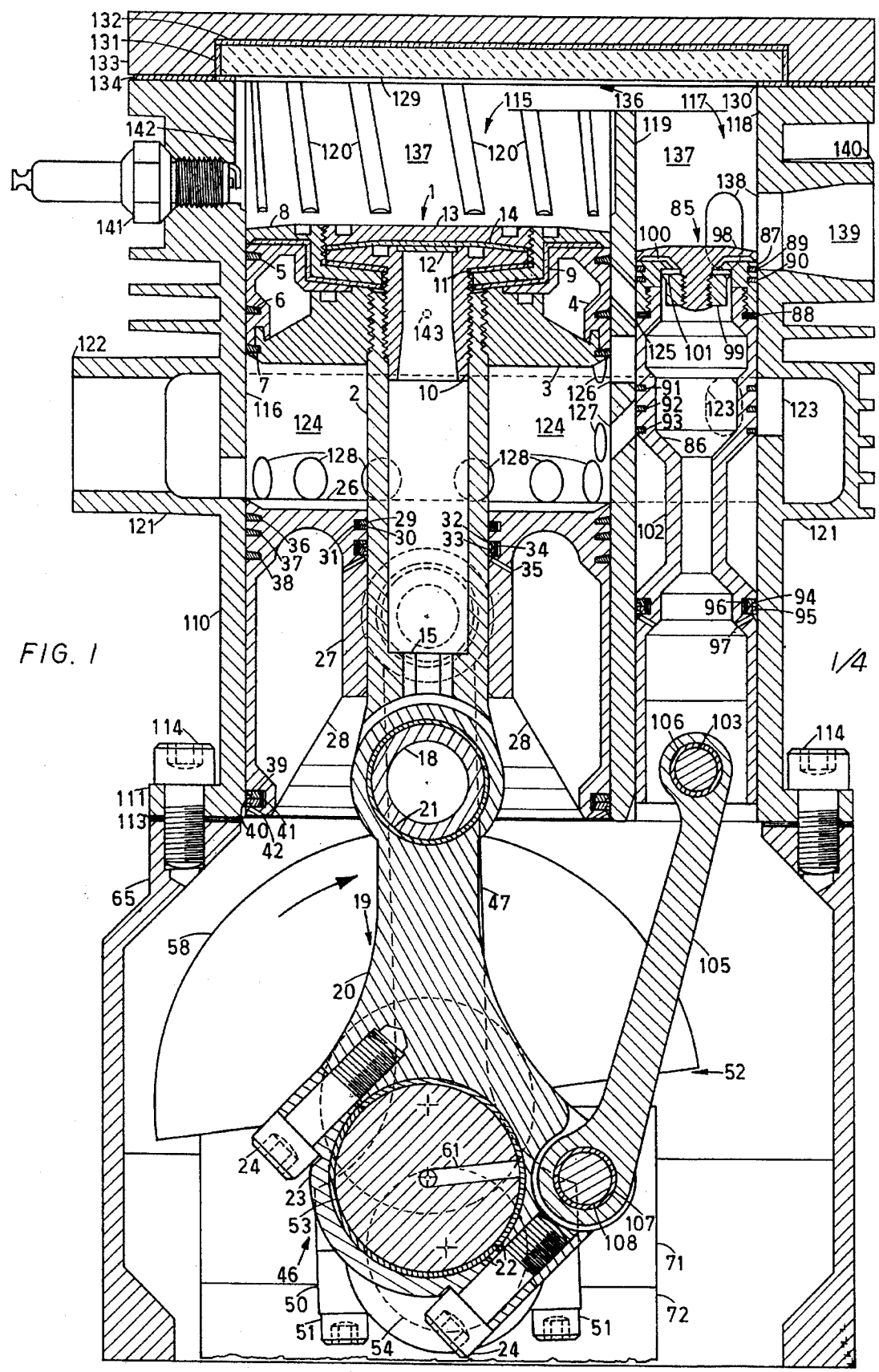
FIG. 1 is a full section view from the front of the small spark-ignition carbureted gasoline utility engine with the crank angle at 180 degrees AMTC, crankshaft rotation is clockwise.

Referring now to the drawings in detail, FIGS. 1,2,3,4, and 5. The engine has a motor piston 1 of the crosshead type attached to a hardened and tempered steel piston rod 2 that screws into a piston base 3, which is machined from steel.

A piston body 4 is machined from steel and has groves for three piston rings; a top motor-piston ring 5, a mid motor-piston ring 6, and a bottom motor-piston ring 7. A motor-piston crown 8, which is made of a refractory alloy such as that used for exhaust valves or gas turbine blades, is insulated from the piston body 4 and the piston base 3 by a piston-crown insulator 9 and clamped against them by a hollow steel crown bolt 10, from which it is insulated by a bolt insulator 11. The insulators, 9 and 11, and other insulators that follow are made of a refractory insulating material encased in a thin stainless steel shell to impede heat transfer. A steel bolt cap 12 covers the hollow center of the crown bolt 10, and both are covered by a refractory alloy crown plug 13 from which they are insulated by a plug insulator 14. The motor piston 1 is an assembly comprising parts 3 through 14.

The piston rod 2 has a hexagon socket 15 near its lower end for use during assembly. The lower end of the piston rod 2 is forked and a hole is machined through both branches for fitting a bronze outer wrist-pin bushing 16 into each. A steel wrist-pin keeper 17 is installed in a groove in each branch to secure a hardened steel wrist pin 18.

A motor connecting rod 19 is assembled of a steel motor-rod shank 20, a bronze inner wrist-pin bushing 21, a pair of motor-crankpin insert bearings 22, a steel motor-rod cap 23, steel motor-rod bolts 24 and bronze outer link-pin bushings 25.

An aluminum alloy charger piston 26 has a central piston-rod boss 27, which is braced by supporting ribs 28, around a center hole so as to serve as a stuffing box and crosshead for the piston rod 2 to slide through. There are two grooves for internal rings. The top groove is fitted with a top-contracting-ring upper half 29, a top-contracting-ring lower half 30 and a top-ring constrictor 31. The bottom groove is fitted with a contracting-oil-ring upper half 32, a contracting-oil-ring lower half 33 and an oil-ring constrictor 34. Central-boss oil drains 35 relieve oil buildup. Tabs may be used on ring constrictors 31 and 34 to maintain separation of the gaps for each pair of ring halves.

There are four grooves for external rings; a first charger compression ring 36, a second charger compression ring 37, a third charger compression ring 38, and a fourth ring assembly comprising a charger-oil-ring upper half 39, a charger-oil-ring lower half 40, and a charger-oil-ring expander 41. Skirt oil drains 42 are drilled to relieve oil buildup.

The upper surface of the charger piston 26 is machined to mate in full contact with the lower surface of the piston base 3 of the motor piston 1.

A hole is machined diametrically across the charger piston 26 for a pair of piston pins 45 that are secured at the inside ends by piston-pin-retaining clips 43 installed in grooves around the holes and at the outside by piston-pin-retaining plugs 44.

Twin charger connecting rods 46 are each assembled from a hardened and tempered high strength steel charger-rod shank 47, a bronze piston-pin bushing 48, a pair of charger-crankpin insert bearings 49, a steel charger-rod cap 50 and a pair of steel charger-rod bolts 51. The charger rod shanks 47 are elliptical in cross section to provide clearance from the skirt of the charger piston 26.

A crankshaft 52 has a short-throw motor crankpin 53 in the middle that separates a pair of long-throw charger crankpins 54, which are phased 8 degrees behind it. It also has a front main journal 55, a rear main-thrust journal 56, a front counterweight 57, a rear counterweight 58, a front shaft 59, and a rear-output shaft 60. The counterweights 57 and 58 are placed diametrically opposite charger crankpins 54 for balance. Their size and position is only roughly estimated and must be optimized by testing. If larger counterweights are required, a crank of larger diameter may be necessary, or mass may be added externally on the flywheel and clutch for single-cylinder engines; two-cylinder engines will require less counterweighting. Drilled crankshaft oil ducts 61 are sealed with oil-duct plugs 62. Crankpin outlets for the oil ducts are drilled from equal crank radii so that centrifugal force does not cause poor oil distribution.

A crankshaft gear 63 is hobbed from a flange behind the rear main-thrust journal 56 for turning an oil-pump gear 64.

A crankcase 65 houses the crankshaft 52 whose front main journal 55 rotates in an upper front-journal shell 66 and a lower front-journal shell 67, which are clamped to the crankcase 65 by a front-journal cap 68. Its rear main-thrust journal 56 rotates in an upper rear-thrust-journal shell 69 and lower rear-thrust-journal shell 70 that are clamped to the crankcase 65 by a rear-thrust-journal cap 71 bolted in conjunction with an oil-pump base 72.

An output-shaft seal 73 is pressed into a rear crankcase cover 74 that is mounted with a rear crankcase gasket 75.

Closure at the front of the crankcase 65 is by a front-shaft seal 76 and a breaker-point housing 77 that is sealed with a front crankcase gasket 78. The breaker-point housing 77 is closed by a breaker-point cover 79. An ignition cam 80 and a flywheel 81 are each keyed to a groove in the front shaft 59 and secured by a flanged flywheel nut 82.

An ignition coil 83 and its laminated core 84 are mounted behind the flywheel 81; other parts of the ignition system such as breaker points and a condenser are not shown.

A piston valve 85 is used comprising a valve body 86 made from aluminum alloy and a valve head 87 made of steel that are threaded for assembly. A stack of valve-head shims 88 are used to adjust the position of the valve head 87 during assembly. There are grooves for six piston rings; a top valve ring 89, a second valve ring 90, a third valve ring 91, a fourth valve ring 92, and a fifth valve ring 93 while the sixth groove has a valve-oil-ring upper half 94, a valve-oil-ring lower half 95 and a value-oil-ring expander 96. Valve oil drains 97 are drilled to relieve oil buildup.

The upper end of the piston valve 85 has a valve crown 98, which is made from a refractory alloy, that screws into a steel valve-crown retainer 99. A valve-crown insulator 100 and a retainer insulator 101 impede heat flow into the valve head 87. The valve body 86 has a narrow spool section 102 for the fuel-air mixture to pass around its waist. It also has a hole machined diametrically across its lower end for a gudgeon pin 103, which is secured by gudgeon-pin-retaining plugs 104 that attaches it to a link rod 105. The link rod 105 has a gudgeon-pin bushing 106 in its upper end and an inner-link-pin bushing 107 in its lower end where it is pivotally attached to the motor-rod shank 20 by a link pin 108, which is secured by link-pin keepers 109.

A cast-iron cylinder block 110 having a cylinder-block flange 111 is positioned on the crankcase 65 with alignment pins 112 with its height adjusted by cylinder-block shims 113 and fastened to it with flange bolts 114.

The cylinder block 110 includes a main cylinder 115 having a main-cylinder wall 116 and a valve cylinder 117 having a valve-cylinder wall 118. The two being separated by a common-wall section 119.

Thirteen transfer channels 120 of 4 mm width and a circular segment cross section of 1 mm depth are machined into the upper end of the main-cylinder wall 116; they spiral up the wall to impart a spin to the fuel-air charge and to even wear along the the motor piston 1 and its rings 5,6 and 7.

An intake manifold 121 having a carburetor flange 122 for attachment of a carburetor, which is not shown, is cast around the mid section of the cylinder block 110.

The initial part of a fuel-air charge is drawn from the carburetor into the intake manifold 121, thence around the outside of the main-cylinder wall 116 and into the central section of the valve cylinder 117 via valve intake ports 123, past the spool section 102 of the piston valve 85 while it is in the upper part of its stroke, thence into the charger cavity 124, which is the space that is contained in the main cylinder 115 between the lower surface of the motor piston 1 and the upper surface of the charger piston 26, via the upper intake ports 125.

The preceding path is open starting at 53 degrees AMTC when the charger piston 26 has separated from the lower surface of the motor piston 1 to about 13% of its full effective stroke and ending at 93 degrees AMTC when both the descending piston valve 85 and the descending motor piston 1 block the upper intake ports 125. Commencing at 83 degrees AMTC, while the upper intake ports 125 are still open, middle intake ports 126 are opened by the descending charger piston 26; they stay open until 138 degrees AMTC when they are closed by the descending piston valve 85. Lower intake ports 127 are opened at 119 degrees AMTC by the descending charger piston 26; they stay open until 180 degrees AMTC when they are closed by the descending piston valve 85. At 138 degrees AMTC, thirteen main intake ports 128 of 8 mm diameter begin to open as the charger piston 26 approaches its nadir and filling of the charger cavity 124 can be readily completed through the large port area that will remain open for 101 degrees of crankshaft 52 rotation until the rising charger piston 26 covers them at 239 degrees AMTC when 90% of its maximum effective stroke remains.

A head plate 129 closes the upper end of the cylinder block 110 from which it is insulated by a lower plate insulator 130. It is insulated around its periphery by a lateral plate insulator 131 and at the top by an upper plate insulator 132. It is shown crosshatched as a refractory ceramic plate; but alternatively, it may be made from a ferrous alloy clad with a refractory alloy lower face. It may have a catalyst incorporated into its surface to promote complete combustion during low power operation.

A cylinder head 133 is sealed to the cylinder block 110 with a copper head gasket 134 so that excess heat from the upper end of the cylinder block 110 will be conducted into the cylinder head 133 and dissipated to the atmosphere. Eight hexagon socket head bolts 135 are used to attach the cylinder head 133 to the cylinder block 110.

The thin stratum of space lying between the head plate 129 and the motor piston 1 when it is above the point where the transfer channels 120 start to open is considered to be the combustion chamber 136. The space contained between the motor piston 1, the piston valve 85 and the head plate 129 will be called the expansion chamber 137; it includes the space occupied by the combustion chamber 136.

Exhaust ports 138 leading through the valve-cylinder wall 118 are positioned for opening at 130 degrees AMTC and closing at 300 degrees AMTC by the valve crown 98 of the piston valve 85. They open into an exhaust passage 139, which is cast integrally with the cylinder block 110 and has an exhaust flange 140 for connection to an exhaust pipe that is not shown.

Primary ignition is effected by a high-tension electric spark across the gap of a spark plug 141 that is supplied from the ignition coil 83; the lead not being shown. An ignition channel 142, which is a special transfer channel of 2 mm depth and 4 mm width, leads from the spark plug 141 upward past the motor piston 1 when it is near its zenith and into the combustion chamber 136. The ring gap for the mid motor-piston ring 6 is positioned by the mid motor-piston-ring pin 143.

Assembly and critical adjustments may be made in the following manner.

The engine is assembled straightforwardly except that no parts of the motor piston 1 are installed nor are any external piston rings installed. The cylinder block 110 is installed temporarily over a full stack of cylinder-block shims 113 on the crankcase 65 with a pair of flange bolts 114 but left open at the top.

The crankshaft 52 is then turned to 11 degrees AMTC and the piston base 3 is screwed onto the piston rod 2 until it contacts the charger piston 26 by using a spanner wrench in the holes provided in the piston base 3 to turn it while using a long hexagon wrench that reaches down into the hexagon socket 15 in the lower part of the piston rod 2 to prevent it from turning because the threads are cut for an interference fit so as to aid in firmly anchoring the parts. The piston base 3 must be adjusted so that a drag is felt from about 11 to 19.5 degrees AMTC of crankshaft 52 rotation.

The crankshaft 52 is then held at 16 degrees BMTC and the difference in height is measured from the lower land for the bottom motor-piston ring 7, which is the ledge around the piston base 3, to the lower end of the transfer channels 120. The cylinder block 110 is then removed and the thickness of the stack of cylinder-block shims 113 is adjusted to eliminate the difference in height so that charge transfer will begin at 16 degrees BMTC.

The piston body 4 is then placed on the piston base 3 taking care that it is turned so that the mid motor-piston-ring pin 143 is positioned rearward to hold the ring gap between the pair of transfer channels 120 at the rear of the main-cylinder wall 116, which, like the pair at the front, are spaced 5 degrees wider than the others. As in most other two cycle engines, all ring gaps should be positioned by pinning so they do not slide over ports. The motor-piston crown 8 and the piston-crown insulator 9 are then placed over the piston body 4, and the crown bolt 10 with its bolt insulator 11 installed is then tightened with a second spanner into the piston rod 2, which is again held with the hexagon wrench, while the motor-piston crown 8 is also prevented from turning by holding it with a third spanner in the holes provided. The crown bolt 10 has threads of finer pitch than those of the piston base 3 so as to aid in locking the assembly in place. The bolt cap 12 and plug insulator 14 are then installed and the crown plug 13 is tightened against them with a fourth spanner while again using the third spanner to prevent the motor-piston crown 8 from turning. The threads between the crown plug 13 and the motor-piston crown 8 should be locked by staking.

After assembly of the motor piston 1 is completed the piston valve 85 should be checked at an exhaust port 138 to ascertain that its position is within acceptable limits when the crankshaft 52 is turned to 130 degrees AMTC; if not, the thickness of the stack of valve-head shims 88 may be adjusted, or manufacturing tolerances may be amended.

The external piston rings may now be assembled on the motor piston 1, charger piston 26 and piston valve 85. The cylinder block 110 may then be installed over them using ring compressors, and further assembly may now be completed in the obvious manner.

Figure 6:
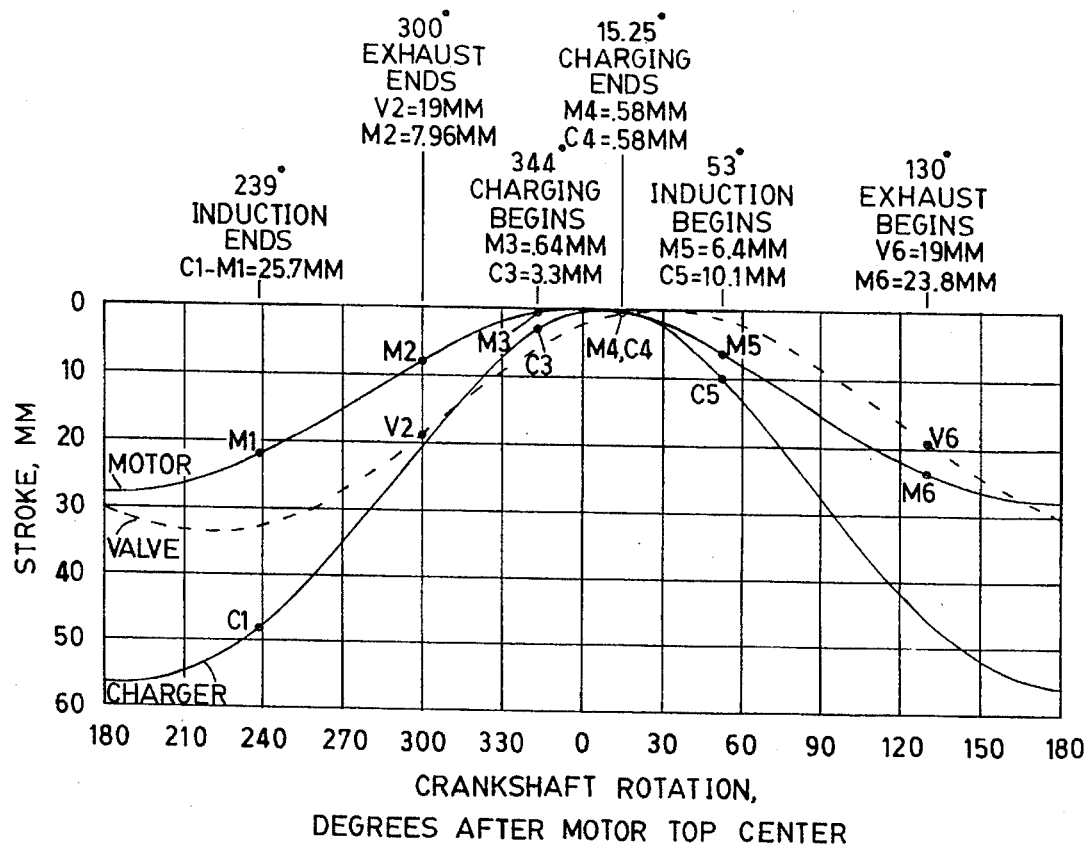
FIG. 6 is a full scale graphical representation of the cycle with solid lines showing the relative position of both pistons as they travel through one revolution while the broken line shows the position of the piston valve; key points during the cycle are labeled.
Figure 5:
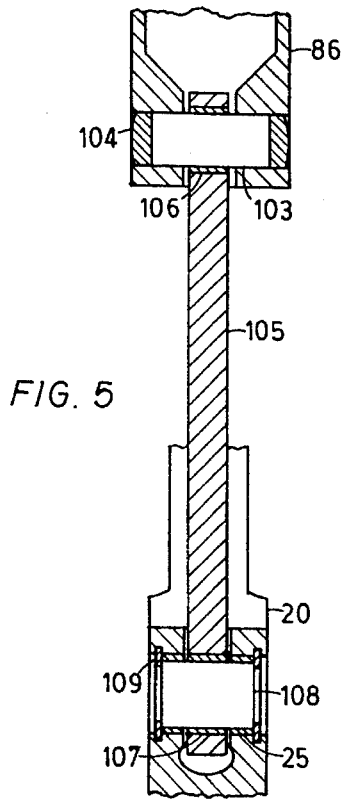
FIG. 5 is a section through the link rod as viewed from the right side of the engine showing its connection to the motor-connecting-rod shank and the piston valve.

Referring now to FIG. 6, which shows two solid line curves and a broken line curve, for a graphical representation of the cycle. The upper solid line curve gives the position of the motor piston 1 as the motor crankpin 53 on the crankshaft 52 is turned through a complete revolution according to the standard equation relating piston travel downward from its zenith, S, to crank radius, R, connecting rod length, L, and the angle, A, that the crankpin is rotated past zero degrees, its top center position:

$$S = R(1 - \cos A + (L/R) - ((L/R)^2 - \sin^2 A)^{1/2})$$

The lower solid line curve gives the position of the charger piston 26 when its values for L and R are used, 8 degrees is subtracted from the angle A, and a small constant, E (about 0.307 mm in the present case), which is the difference between the motor piston 1 stroke and the charger piston 26 stroke at 15.25 degrees AMTC, is added to the value of the charger piston 26 stroke so as to displace the charger curve downward so that the two curves will meet with a common tangent at 15.25 degrees AMTC, which is the crank angle when the two curves have the same slope if an 8 degree lead angle is used; that is, both pistons are then moving downward at the same rate as the crankshaft 52 turns. The crank angle when the two curves have the same slope will be called the contact angle.

The contact angle must be found before the other calculations are made. This may be done by taking the derivative with respect to the angle, A of the piston position equation:

$$dS/dA = R \sin A(1 + \cos A((L/R)^2 - \sin^2 A)^{-1/2})$$

and finding the crank angle, A, which will make dS/dA for the motor piston 1 equal to dS/dA for the charger piston 26 when its crank angle is set at A−8 degrees and its values for L and R are used. This can be done readily by iteration with estimated values of A on a programmable hand scientific calculator to find a value for A that will give 1 when dividing dS/dA for the motor piston 1 by dS/dA for the charger piston 26.

If it is assumed that the upper, curve represents the position of the lower edge of the bottom motor-piston ring 7, then the lower curve will represent the position of the upper edge of the top surface of the charger piston 26. The vertical distance between the curves will then give the instantaneous effective stroke of the charger piston 26, from which its displacement can be calculated if multiplied by its area, and the vertical distance from the horizontal axis down to the upper curve gives the stroke of the motor piston 1. Note that the zenith of the charger piston 26 curve is displaced downward by the distance E (0.307 mm) from the horizontal axis while the zenith of the motor piston 1 curve touches it.

It is necessary to lay out the lower end of the engine simultaneously with application of the preceding equations to find values of L and R to use in them when designing a new engine. In order to make a tractable utility engine for operation at moderate cyclic speeds, a small lead angle, 8 degrees, was used in the preferred embodiment. This allows the charger piston 26 to be brought into contact with the motor piston 1 at around 15.25 degrees AMTC so that charging can end at approximately that angle and therefore start at an equal angle BMTC, 16 degrees AMTC and BMTC respectively being used. This also gives small openings (0.64 mm max. height) into the shallow transfer channels that are expected be a final barrier to prevent combustion from entering the charger cavity during low speed operation because the openings will be fairly thin as charging nears completion thereby tending to maintain a higher velocity of the working fluid through them. The small lead angle with its thin openings into the transfer channels will probably not be favored for high speed engines wherein deeper charging channels with a greater lead angle so as to have taller openings leading into them will probably be desired. The openings into the transfer channels may be varied to suit engineering requirements as they will increase proportionately at about twice the rate the lead angle is increased. For instance, if the lead angle were increased to 12 degrees, the slope of the curves would be equal at 22.55 degrees AMTC and charging could begin and end at 23 degrees BMTC and AMTC respectively when the stroke of the motor piston 1 is 1.31 mm, which gives openings into the transfer channels of slightly over twice that for 16 degrees BMTC when an 8 degree lead angle is used. Note that as a rule of thumb, the contact angle is about double the lead angle.

The broken line curve gives the distance, D, that the piston valve 85 has traveled below its zenith as a function of the angle of crankshaft 52 rotation AMTC, A. It can be found with the equation:

$$D = R - R \cos A - M(R/L) \sin A + (N^2 - (F-M)^2)^{1/2} - (N^2 - (F - R \sin A - (M^2 - (M(R/L) \sin A)^2)^{1/2})^2)^{1/2} + H$$

where R is the crank radius of the motor crankpin 53, L is the length of the motor connecting rod 19, M is the distance from the motor crankpin 53 center to the link pin 108 center, N is the length of the link rod 105 from the link pin 108 center to the gudgeon pin 103 center and F is the distance between the main cylinder 115 axis and the valve cylinder 117 axis. Because the equation was derived for finding piston valve 85 travel from its height when the crankshaft 52 is at motor top center position, but the piston valve 85 first moves upward a short distance before descending, the expression is first evaluated to find the zenith of piston valve 85 travel. A constant H equal to the upward (negative) travel is then added to bring the value of the expression to zero at that angle so as to give positive values for piston valve 85 travel when measured downward from its zenith.

The equations have been evaluated using an 8 degree lead angle and the following other particular values pertaining to the engine drawn; the results being shown in the graph, FIG. 6:

motor-crankpin crank radius=14 mm motor-connecting-rod length=77 mm charger-crankpin crank radius=28 mm charger-connecting-rod length=123.2 mm link-pin center to motor-crankpin center=31 mm link-rod length=83 mm main-cylinder axis to valve-cylinder axis=53 mm The main-cylinder bore is 72 mm and the valve-cylinder bore is 24 mm, but these figures are not used in the calculations.

Key points of the operating cycle of the engine are indicated and labeled in FIG. 6 while the following is a more detailed description of the cycle.

Figure 2:
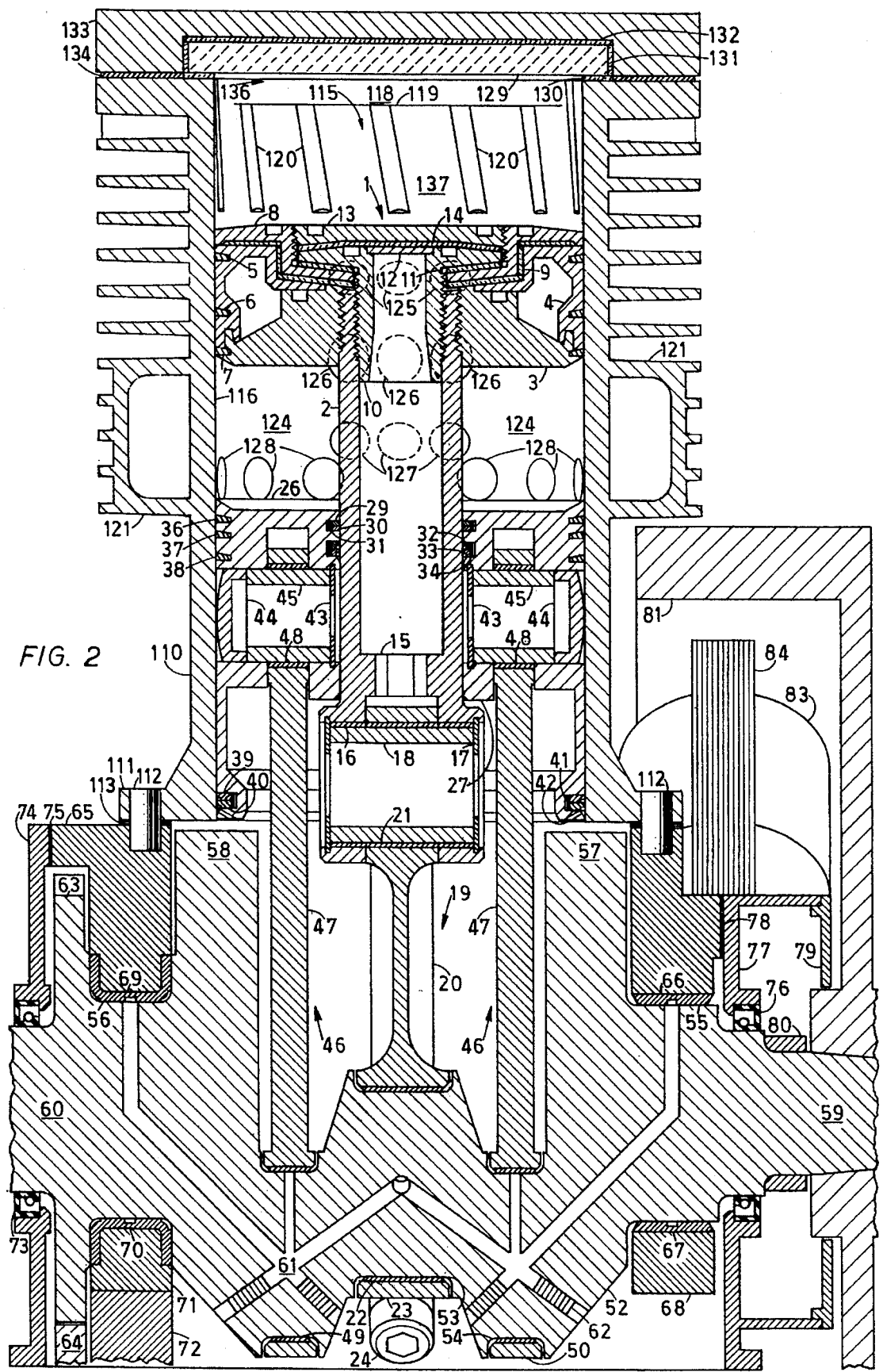
FIG. 2 is a full-section view from the left side of the engine with the crank angle at 180 degrees AMTC.
Figure 3:
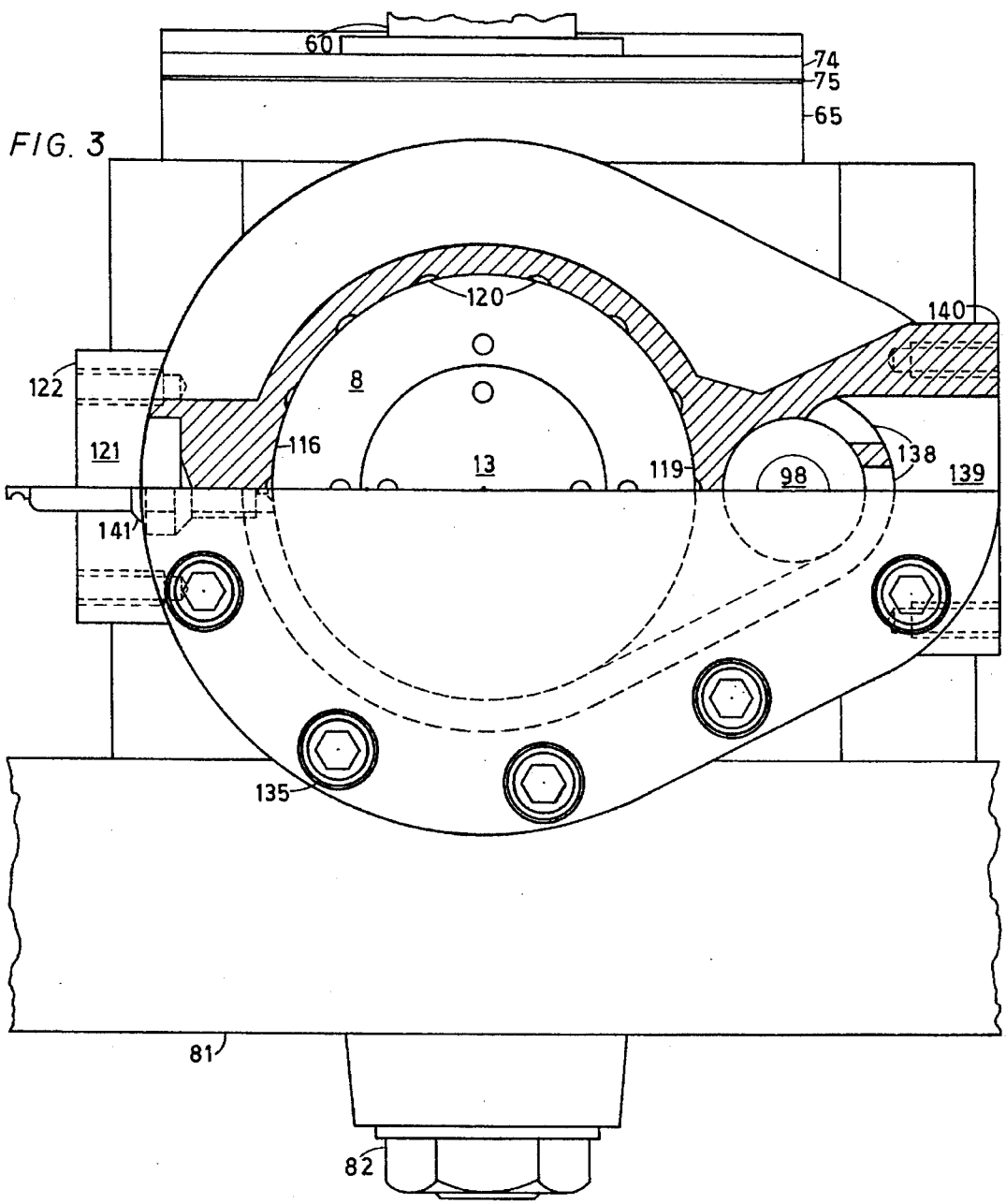
FIG. 3 is a half-section top view of the engine with the sectioning across the cylinder block near the lower end of the transfer channels.
Figure 4:
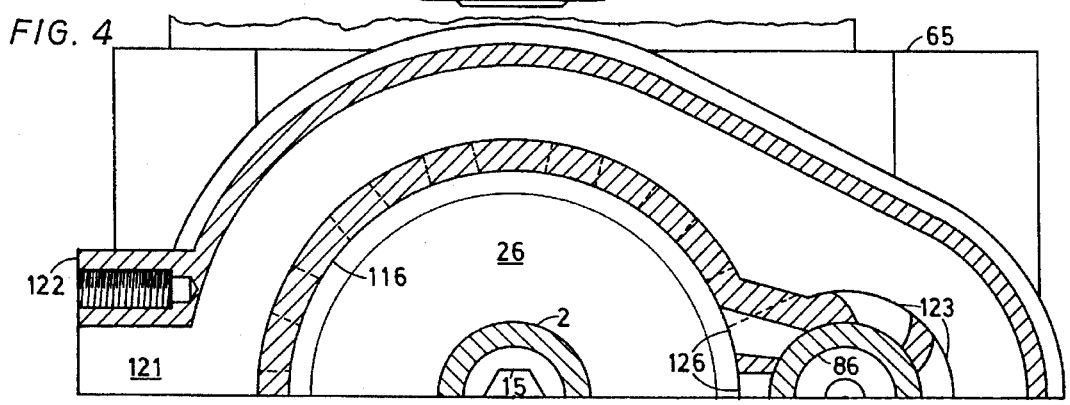
FIG. 4 is a half-section viewed from the top of the engine with the cutting plane across the middle of the intake manifold then offset diagonally upward through the middle intake ports, across the piston valve, through the valve intake ports and across the remainder of the intake manifold.

The cycle is assumed to start at 180 degrees AMTC, the crankshaft 52 position shown in FIGS. 1 and 2. At that time the motor piston 1 is full down at its nadir, and the charger piston 26 is nearly so. The exhaust ports 138 are almost full open and blowdown is nearly complete; the main intake ports 128 are virtually full open and filling of the charger cavity 124 with a fuel-air charge is nearing completion.

Compression-Exhaust Stroke:

As the motor piston 1 moves upward, additional exhaust will be pushed out while the charger piston 26 passes its nadir and moves upward, covering the main intake ports 128 and sealing in the fuel-air charge at 239 degrees AMTC when at 90% of its maximum effective stroke. The piston valve 85 reaches its nadir at 219.5 degrees AMTC; it lags behind the rising motor piston 1 and keeps each set of intake ports 127, 126 and 125 sealed until the rising charger piston 26 provides the seal. AT 300 degrees AMTC, the piston valve 85 closes the exhaust ports 138 thereby sealing hot residual gas into the expansion chamber 137. As the charger piston 26 closes toward the motor piston 1 while both rise in the cylinder, the fuel-air charge is compressed in the charger cavity 124 and residual gas is compressed into the combustion chamber 136. At 344 degrees AMTC (16 Degrees BMTC), the lower edge of the bottom motor-piston ring 7 rises past the bottom edge of the transfer channels 120 that are located in the upper portion of the main-cylinder wall 116. This allows the fuel-air charge, which is compressed into 10.5 percent of its atmospheric pressure volume (9.5 to 1 compression ratio) at about 2400 kPa pressure, to flow into the combustion chamber 136 through the transfer channels 120 where the residual gas is only compressed into 30 percent of its atmospheric pressure volume (3.3 to 1 compression ratio) at a pressure of perhaps 540 kPa. Initial flow will be fast; however, ignition will take place as the fuel-air charge contacts the compressed residual gas, which will be above the ignition temperature unless the engine is operating at low power in which case ignition will be effected by the spark plug 141. Combustion is expected to proceed cursively as the fuel-air charge enters the insulated combustion chamber 136 where most of the exposed surface will be at extremely high temperature when the engine is running at high power levels.

Note that during the period when the transfer channels 120 are open to the charger cavity 124, the motor piston 1 is floating with somewhat more pressure on its lower surface than on its upper surface. During this period, the charger piston 26, while containing the high pressure gases, also functions as a motor piston in transmitting the force derived from the pressure to the crankshaft 52 through the charger crankpins 54. The compression stroke is considered to end when the charger piston 26 reaches its zenith at 8 degrees AMTC even though the AMV (angle of minimum volume) occurs almost 1 degree later because the piston valve 85 is still rising and reaches its zenith at about 30 degrees AMTC.

Power-Intake Stroke:

The power stroke starts as the AMV is passed, even though it is the charger piston 26 that provides torque to the crankshaft 52 while it is still forcing the final portion of the charge into the combustion chamber 136 because the net combined volume of the charger cavity 124 plus the expansion chamber 137, which is held to include the space above the piston valve 85 as well as the space above the motor piston 1, is increasing after AMV.

The motor piston 1 is adjusted during final assembly by screwing the piston base 3 onto the piston rod 2 until it is in interference with the charger piston 26 by about 50 microns at 15.25 degrees AMTC prior to locking it into place. The charger piston 26 would then make contact with the motor piston 1 at about 11 degrees AMTC if it were not under pressure; however, the pressure is expected to be high enough, 6000 to 7000 kPa, to compress the charger connecting rods 46 by the 50 microns when the engine is operating at maximum pressure; therefore, the adjustment is necessary to effect complete transfer of the fuel-air charge during full power operation. When the intake is throttled, charging will then be completed up to almost 4 degrees earlier depending on the extent of throttling. A fortunate effect that will oppose the pressure drop in the combustion chamber caused by throttling.

With charging completed, the pistons stay in contact, or very close, until after 16 degrees AMTC when the lower edge of the bottom motor-piston ring 7 descends past the lower edge of the transfer channels 120 to seal the combustion chamber 136. The power stroke then proceeds with the crosshead motor piston 1 transmitting the energy derived from the expansion of the hot high pressure combustion gas in the expansion chamber 137 to the crankshaft 52.

The intake stroke starts as the charger piston 26 descends faster than the motor piston 1 after 16 degrees AMTC and starts opening a charger cavity 124. At 53 degrees AMTC the outer edge of the upper surface on the descending charger piston 26 begins uncovering the upper intake ports 125 to start drawing in the next fuel-air charge via the valve cylinder 117 and the intake manifold 121 from the carburetor. As the intake stroke proceeds, the middle intake ports 126, and the lower intake ports 127, are opened in turn. As the power stroke proceeds, the piston valve 85, which is connected through a link rod 105 to the motor connecting rod 19, follows while lagging in phase behind the motor piston 1 varying from about 30 degrees at its zenith to nearly 40 degrees at its nadir. It starts uncovering the exhaust ports 138 at 130 degrees AMTC allowing exhaust blowdown to proceed. It also covers each set of intake ports 125, 126 and 127 after the next lower set is opened, and each set will remain covered until closed by the charger piston 26 in its subsequent ascent. The main intake ports 128 are opened by the charger piston 26 in its descent at 138 degrees AMTC, and they will be full open by 188 degrees AMTC, which will allow rapid filling of the charger cavity to start another cycle.

I claim:

1. In a two-stroke cycle reciprocating engine, which inducts and compresses working fluid including air and supplies it under pressure materially above atmospheric to a combustion chamber for a main cylinder with means for exhaust closed, and which has means for attachment of a device for introducing fuel into the working fluid, and which has means for ignition, wherein the improvement comprises:

(a) a crosshead type motor piston, which fits the main cylinder for reciprocation therein, having a lower surface that is closed and suitable to be approached;

(b) a piston rod that is attached to the motor piston;

(c) a charger piston, which fits the main cylinder for reciprocation therein, located below the lower surface of the motor piston, having an upper surface shaped for approaching the lower surface of the motor piston and having a central hole through which the piston rod slides;

(d) a motor connecting rod that is pivotally attached to the piston rod;

(e) a pair of charger connecting rods that are pivotally attached to the charger piston;

(f) a crankshaft having a motor crankpin on which the motor connecting rod is rotatively attached and having a pair of charger crankpins on which the charger connecting rods are rotatively attached, the crank radius of the charger crankpins being larger than the crank radius of the motor crankpin while the crank angle between the motor crankpin and the charger crankpins is proximally phased to bring the charger piston to the zenith of its travel while the motor piston is near the zenith of its travel; and (g) the main cylinder having a length sufficient for a charger cavity to be opened between the lower surface of the motor piston and the upper surface of the charger piston when each is near the nadir of its travel and having a plurality of intake ports through its wall into the charger cavity for induction of working fluid and also having a plurality of transfer channels whose lower ends are uncovered by the motor piston when nearing the zenith of its travel while the channels extend upward past the motor-piston crown to the combustion chamber, so that as the crank rotates the pistons reciprocate in concert, creating a charger cavity between the pistons that expands and contracts once in the cycle from differential motion of the pistons while the cavity is brought to its minimum volume when the motor piston is near its zenith so that the working fluid, which is drawn into the charger cavity when the pistons are in the lower part of their strokes, is compressed and forced through the transfer channels past the motor piston into the combustion chamber where heat is added by internal-combustion and mechanical energy is extracted while it expands against the motor piston as it moves downward.

2. In a two-stroke cycle reciprocating engine in which a charge of working fluid is inducted, compressed and forcibly transferred, which means for exhaust is closed, into an expansion chamber, which is enclosed above a motor piston traversing the upper half of reciprocation in a main cylinder, where it is subsequently heated and expanded for the extraction of mechanical energy, wherein the improvement comprises:

(a) the motor piston, which fits the main cylinder for reciprocation therein, having a lower surface that is closed and suitable to be approached;

(b) a charger piston, which is located below the lower surface of the motor piston, having an upper surface shaped for approaching the lower surface of the motor piston;

(c) means for obturation between the charger piston and the wall of the main cylinder; and (d) means for reciprocation of the motor piston and the charger piston in concert with a phase angle that creates a charger cavity between the pistons that expands and contracts once in the cycle so that induction and expulsion of working fluid may be effected by differential motion of the pistons.

3. A two-stroke cycle reciprocating engine that includes a tandem-differential-piston mechanism as recited in claim 2, further comprising:

(a) means for induction of working fluid into the charger cavity; and (b) means for transferring working fluid from the charger cavity into the expansion chamber.

4. A tandem-differential-piston engine according to claim 3, characterized in that:

(a) The means for induction of working fluid into the charger cavity includes a port through the wall of the main cylinder.

5. A tandem-differential-piston engine according to claim 4, characterized in that:

(a) the motor piston is of the crosshead type;

(b) a piston rod is used on which to mount the motor piston;

(c) the charger piston has a hole for sliding of the piston rod; and (d) the means for obturation between the charger piston and the wall of the main cylinder includes sizing its outside diameter to fit the main cylinder.

6. A tandem-differential-piston engine according to claim 5, wherein the means for reciprocation comprises:

(a) a motor connecting rod that is pivotally attached to the piston rod;

(b) a pair of charger connecting rods that are pivotally attached to the charger piston; and (c) a crankshaft having a motor crankpin on which the motor connecting rod is rotatively attached and also having a pair of charger crankpins on which the charger rods are rotatively attached.

7. A tandem-differential-piston engine having a crosshead motor piston and a connecting-rod-crankshaft-reciprocation system according to claim 6, further comprising:

(a) A link rod that is pivotally attached at one end to the motor connecting rod; and (b) means for controlling induction porting and exhaust porting of the working fluid that is actuated by the link rod.

8. A tandem-differential-piston engine having a crosshead motor piston and a connecting-rod-crankshaft-reciprocation system according to claim 6, characterized in that:

(a) the crank radius for the charger crankpins is made greater than the crank radius of the motor crankpin so that the charger piston will have a longer real stroke than the motor piston;

(b) the crank angle between the charger crankpins and the motor crankpin is made small enough for the charger cavity to be at its minimum volume when the motor piston is near its zenith; and (c) the means for transferring working fluid from the charger cavity to the expansion chamber includes the main cylinder having at least one transfer channel, which is uncovered at the bottom as the motor piston nears the zenith of its travel while reaching upward past the motor-piston crown to open a passage from the charger cavity to a thin stratum of the expansion chamber, called the combustion chamber, that remains above the motor piston while the charge is being transferred, so that working fluid, which is drawn into the charger cavity when both of the pistons are in the lower part of their strokes, is compressed and forced through the transfer channel, and into the combustion chamber.

9. A tandem-differential-piston engine according to claim 8, characterized in that:

(a) the main cylinder is provided with a plurality of transfer channels that are arrayed around its upper wall and through which the working fluid is transferred from the charger cavity into the combustion chamber so that heat may be absorbed from the main-cylinder wall into the working fluid as it passes, so as to increase its temperature and pressure while cooling the main-cylinder wall and reducing the need for external cooling.

10. A tandem-differential-piston engine according to claim 9, further comprising:

(a) means for attachment of a device for introduction of fuel into the working fluid.

11. A tandem-differential-piston engine according to claim 10, characterized in that:

(a) the means for attachment of a device for introduction of fuel into the working fluid is a carburetor flange on an intake manifold that ducts working fluid to the intake ports, so that when a carburetor is attached thereon, air may be drawn through it, and fuel may be introduced to the air before the main intake ports into the charger cavity are closed, and the working fluid will include a fuel-air mixture.

12. A tandem-differential-piston engine according to claim 11, further comprising:

(a) means for ignition of the charge of working fluid when it includes a fuel-air mixture.

13. A tandem-differential-piston engine according to claim 12, characterized in that:

(a) the means for ignition includes a spark plug.

14. In a two-stroke pump-compression cycle internal-combustion reciprocating engine in which a charge of working fluid including air is inducted, compressed and forcibly transferred, while means for exhaust is closed, into an expansion chamber, which is enclosed above a motor piston traversing the upper half of reciprocation in a main cylinder, where it is subsequently heated by internal-combustion of fuel and employed to force the motor piston downward in the main cylinder for the extraction of mechanical energy, characterized in that:

(a) the motor piston, which fits the main cylinder for reciprocation therein, has a lower surface that is closed and suitable to be approached;

(b) a charger piston is located below the lower surface of the motor piston and has an upper surface shaped for approaching the lower surface of the motor piston;

(c) means for obturation prevents the flow of working fluid between the charger piston and the wall of the main cylinder;

(d) means for reciprocation of the motor piston and the charger piston in concert with a phase angle that creates a charger cavity between the pistons that expands and contracts once in the cycle effects induction and expulsion of working fluid by differential motion of the pistons;

(e) means for induction of working fluid conveys it into the charger cavity; and (f) means for transferring working fluid conducts it from the charger cavity to the expansion chamber.

15. A tandem-differential-piston engine operating on a pump-compression cycle according to claim 14, characterized in that:

(a) the means for transferring working fluid that conducts it from the charger cavity to the expansion chamber includes the main cylinder having at least one transfer channel, which is isolated from the charger cavity by the motor piston until being uncovered at the bottom as the motor piston nears the zenith of its travel while reaching upward past the motor-piston crown to open a passage from the charger cavity to a thin stratum of the expansion chamber, called the combustion chamber, that remains above the motor piston while the charge is being transferred, so that working fluid, which is drawn into the charger cavity when both of the pistons are in the lower part of their strokes, is compressed and forced through the transfer channel, and into the combustion chamber.

16. A tandem-differential-piston engine according to claim 15, characterized in that:

(a) the main cylinder is provided with a plurality of transfer channels that are arrayed around its upper wall and through which the working fluid is transferred from the charger cavity into the combustion chamber so that heat may be absorbed from the main-cylinder wall into the working fluid as it passes, so as to increase its temperature and pressure while cooling the main-cylinder wall and reducing the need for external cooling.

17. A tandem-differential-piston engine according to claim 14, characterized in that:

(a) the motor piston is of the crosshead type;

(b) a piston rod is used for mounting of the motor piston;

(c) the charger piston has a hole for sliding of the piston rod; and (d) the means for obturation includes sizing the outside diameter of the charger piston to fit the bore of the main cylinder.

18. A tandem-differential-piston engine according to claim 17, characterized in that:

(a) a motor connecting rod is pivotally attached to the piston rod;

(b) a pair of charger connecting rods are pivotally attached to the charger piston, and (c) a crankshaft has a motor crankpin on which the motor connecting rod is rotatively attached and also has a pair of charger crankpins on which the charger rods are rotatively attached for reciprocation of the charger piston in concert with the motor piston.

19. A tandem-differential-piston engine having a crosshead motor piston and a connecting-rod-crankshaft-reciprocation system according to claim 18, characterized in that:

(a) the crank radius for the charger crankpins is made greater than the crank radius of the motor crankpin so that the charger piston will have a longer real stroke than the motor piston;

(b) the crank angle between the charger crankpins and the motor crankpin is made small enough for the charger cavity to be at its minimum volume when the motor piston is near its zenith; and (c) the means for transferring working fluid from the charger cavity to the expansion chamber includes the main cylinder having at least one transfer channel, which is isolated from the charger cavity by the motor piston until it is uncovered at the bottom as the motor piston nears the zenith of its travel while reaching upward past the motor-piston crown to open a passage from the charger cavity to a thin stratum of the expansion chamber, called the combustion chamber, that remains above the motor piston while the charge is being transferred, so that working fluid, which is drawn into the charger cavity when both of the pistons are in the lower part of their strokes,i is compressed and forced through the transfer channel, and into the combustion chamber.

20. A tandem-differential-piston engine according to claim 19, characterized in that:

(a) the main cylinder is provided with a plurality of transfer channels that are arrayed around its upper wall and through which the working fluid is transferred from the charger cavity into the combustion chamber so that heat may be absorbed from the main-cylinder wall into the working fluid as it passes, so as to increase its temperature and pressure while cooling the main-cylinder wall and reducing the need for external cooling;

(b) means for attachment of a device for introduction of fuel into the working fluid is incorporated; and (c) a spark plug is used as a means for ignition.

* * * * *

UNITED STATES PATENT AND TRADEMARK OFFICE
CERTIFICATE OF CORRECTION

PATENT NO.    : 5,509,382
DATED         : Apr. 23, 1996
INVENTOR(S)   : Ronald D. Noland It is certified that error appears in the above-indentified patent and that said Letters Patent is hereby corrected as shown below:

Column 4, line 61, after "temperature" delete "i".

Column 12, line 41, change "value" to --valve--.

Column 16, line 22 and 23, the equation should appear as follows:

$$D = R - R \cos A - M(R/L) \sin A + (N^2 - (F-M)^2)^{\frac{1}{2}} - (N^2 - (F - R \sin A - (M^2 - (M(R/L) \sin A)^2)^{\frac{1}{2}})^2)^{\frac{1}{2}} + H$$

Claim 2, line 3, change "which" to --while--.

Claim 19, line 24, after "strokes," delete "i".

Signed and Sealed this

Eighteenth Day of February, 1997

Attest:

BRUCE LEHMAN

*Attesting Officer*       *Commissioner of Patents and Trademarks*